US006817959B1

United States Patent
Blaimschein

(10) Patent No.: US 6,817,959 B1
(45) Date of Patent: Nov. 16, 2004

(54) CHAIN WHEEL

(75) Inventor: Franz Blaimschein, Sattledt (AT)

(73) Assignee: Miba Sintermetall Aktiengesellschaft, Laakirchen (AT)

( * ) Notice: Subject to any disclaimer, the term of this patent is extended or adjusted under 35 U.S.C. 154(b) by 63 days.

(21) Appl. No.: 10/070,965

(22) PCT Filed: Aug. 23, 2000

(86) PCT No.: PCT/AT00/00225
§ 371 (c)(1),
(2), (4) Date: Mar. 13, 2002

(87) PCT Pub. No.: WO01/20194
PCT Pub. Date: Mar. 22, 2001

(30) Foreign Application Priority Data

Sep. 16, 1999 (AT) .................................................. 635/99

(51) Int. Cl.[7] .......................... F16H 55/30; F16H 55/36
(52) U.S. Cl. ...................................... 474/152; 474/166
(58) Field of Search .................................. 474/160, 152, 474/155–157, 161–162, 170, 190, 179, 174–178, 166, 167, 902, 150; 74/446–448, 434, 443; D8/360; 29/893.3, 893.37

(56) References Cited

U.S. PATENT DOCUMENTS

| | | | | |
|---|---|---|---|---|
| 763,993 A | * | 7/1904 | Mason ......................... | 74/447 |
| 1,433,923 A | * | 10/1922 | Anthony ....................... | 74/448 |
| 4,078,445 A | * | 3/1978 | Kiser, Jr. .................... | 29/893.3 |
| 4,144,773 A | * | 3/1979 | Addicks ...................... | 474/161 |
| 4,367,068 A | * | 1/1983 | Johncox et al. ............... | 74/447 |
| 4,718,396 A | | 1/1988 | Shimada et al. | |
| 4,929,220 A | | 5/1990 | Hosono et al. | |
| 5,081,416 A | | 1/1992 | La Croix | |
| 5,549,091 A | | 8/1996 | Tsunoda et al. | |
| 6,090,320 A | * | 7/2000 | Grundner et al. ........... | 264/113 |
| 6,099,426 A | * | 8/2000 | Nakagomi et al. .......... | 474/161 |

FOREIGN PATENT DOCUMENTS

| | | |
|---|---|---|
| DE | 36 35 756 | 4/1987 |
| GB | 2 136 582 | 9/1984 |
| JP | 08-135478 | 5/1996 |
| JP | 10-2908 | 1/1998 |
| JP | 10-213454 | 8/1998 |
| JP | 10-220263 | 8/1998 |

* cited by examiner

Primary Examiner—Marcus Charles
(74) Attorney, Agent, or Firm—Collard & Roe, P.C.

(57) ABSTRACT

A chain wheel is described with a wheel body consisting of a wheel rim and a wheel hub which wheel body carries a transmitter ring with radially projecting shoulders for detecting various angles of rotation or ranges of angles of rotation. In order to provide advantageous constructional conditions, it is proposed that the transmitter ring provided with inwardly projecting shoulders can be inserted into the wheel rim and can be attached to supports which are distributed over the inner circumference of the wheel rim and can be attached to supports which are distributed over the inner circumference of the wheel rim and form an axial support for the transmitter ring.

3 Claims, 1 Drawing Sheet

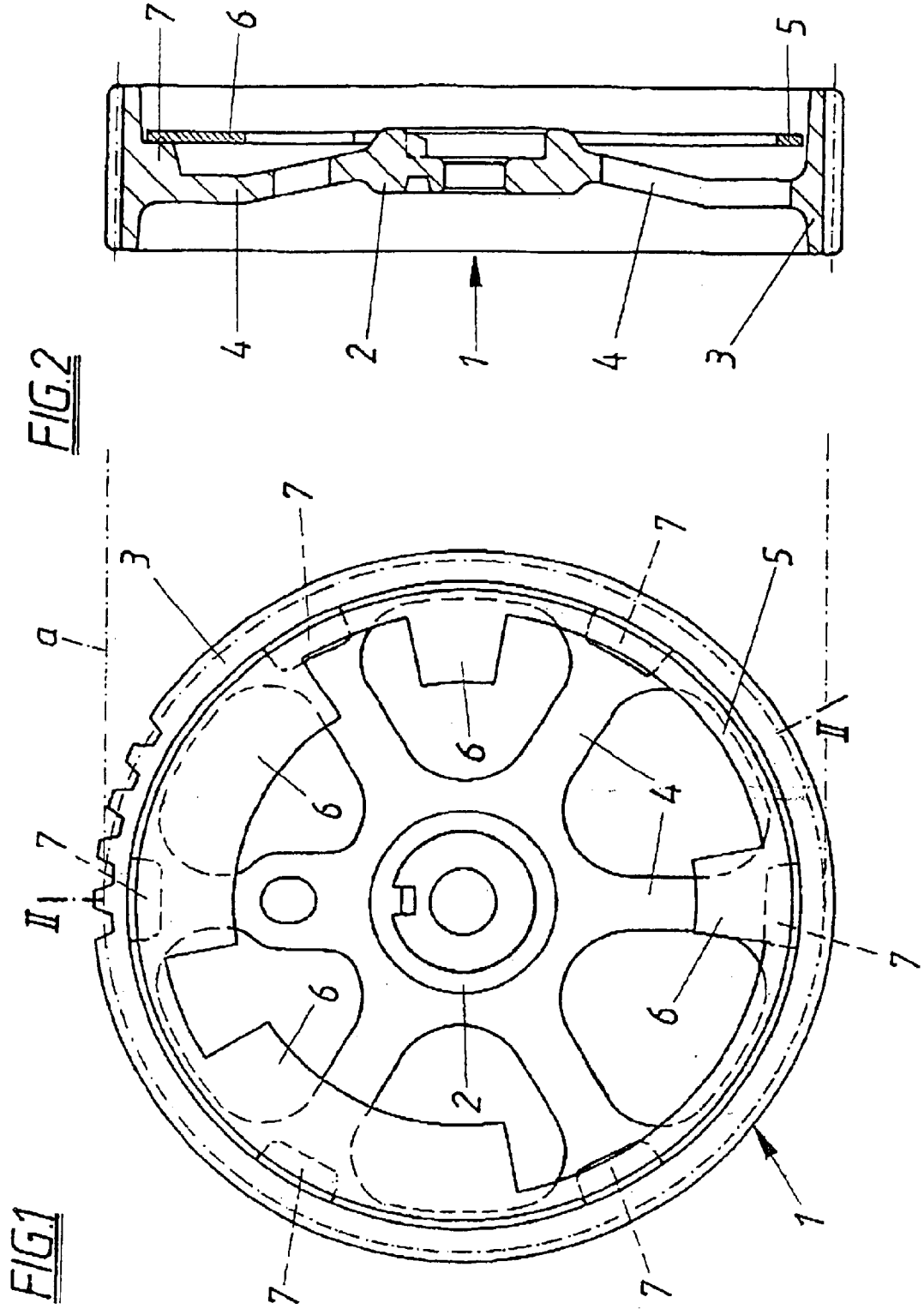

CHAIN WHEEL

REFERENCE TO RELATED APPLICATIONS

Applicant claims priority under 35 U.S.C. §119 of Austrian application GM 635/99, filed on Sep. 16, 1999. Applicant also claims priority under 35 U.S.C. §365 of PCT/AT00/00225, filed on Aug. 23, 2000. The international application under PCT article 21(2) was not published in English.

BACKGROUND OF THE INVENTION

The invention relates to a chain wheel with a wheel body consisting of a wheel rim and a wheel hub, which wheel body carries a transmitter ring with radially projecting shoulders for detecting various angles of rotation or ranges of angles of rotation.

DESCRIPTION OF THE PRIOR ART

In order to enable performing controls which depend on the angle of rotation or range of angle of rotation of a chain wheel, the wheel body of the chain wheel is connected with a transmitter ring which is provided with radially projecting shoulders for the contactless (e.g. electromagnetic) detection of the angle or rotation or ranges of angles of rotation as determined by said shoulders. The transmitter ring is placed on the wheel hub of the chain wheel and is caulked with the hub, so that the shoulders project in a radially outwardly fashion into the scanning range of a respective sensor. Since the measurement precision of angle-of-rotation transducers with such transmitter rings which are arranged as stamped parts depends, among other things, on the surface evenness of the transmitter ring, a sufficient stiffness and thus a respective thickness of the transmitter ring is required in order to avoid having to cope with any distortions and thus measurement errors due to axial run-out, which shoulders should have a respective distance from the rotational shaft of the wheel body for reasons of the measurement precision. Notice must further be taken in this connection that due to the demand for the lowest possible weight, the shoulders which extend over a larger angle at circumference are supported by radial arms of the transmitter ring which contributes to the tendency towards distortions in the zone of the shoulders.

SUMMARY OF THE INVENTION

The invention is thus based on the object of providing a chain wheel of the kind mentioned above in such a way that, on the one hand, narrow run-out tolerances can be ensured and, on the other hand, savings in weight are enabled.

This object is achieved by the invention in such a way that the transmitter ring provided with inwardly projecting shoulders can be inserted into the wheel rim and can be attached to supports which are distributed over the inner circumference of the wheel ring and form an axial support for the transmitter ring.

Since the shoulders of the transmitter ring which cooperate with the sensor should be provided with a respective radial distance from the rotaional shaft of the wheel body due to the desired measurement precision, the supports which project inwardly in this case can be disposed with a comparably low radial projecting length in the case of a transmitter ring which is not associated with the hub but with the wheel rim, which in connection with a ring attachment not over the circumference but over the face side of the transmitter ring reduces the requirements placed on the torsional stiffness which is necessary for the run-out tolerance, so that the thickness of the transmitter ring can be reduced accordingly, e.g. it can be halved. In this way it is not only possible to ensure the desired reduction in weight, but it is also possible to ensure the reduction of the balance error caused by the transmitter ring. The face-sided axial support of the transmitter ring is provided in a simple manner on respective supports of the wheel body, so that the transmitter ring merely needs to be axially inserted into the wheel rim until it rests on the supports and then needs to connected with the supports.

Since the usual chain wheels are provided with wheel spokes between the hub and the wheel rim, particularly simple constructional conditions are obtained for such chain wheels when the supports are provided in the neck zone of the spokes on the wheel rim. In this case, the supports can be formed by a machining neck on the wheel spokes which hardly increases the weight of the wheel body. The supporting forces are absorbed in any case by the wheel spokes.

The transmitter ring can be glued tightly to the supports. Particularly favorable fastening conditions are obtained, however, when the transmitter ring can be attached to the supports by spot welding. In this case the supports form respective welding projections.

BRIEF DESCRIPTION OF THE DRAWINGS

The subject matter is shown by way of example in the drawings, wherein:

FIG. 1 shows a chain wheel in a face view, and

FIG. 2 shows said chain wheel in a sectional view along line II—II of th FIG. 1.

DETAILED DESCRIPTION OF THE PREFERRED EMBODIMENTS

As is shown by the embodiment according to FIGS. 1 and 2, the wheel body 1 consists of a hub 2 and a wheel rim 3 which is connected with the hub 2 via spokes 4.

In order to enable the contactless detection of various angles of rotation or ranges of angles of rotation of the wheel body 1 with the help of a sensor, a transmitter ring 5 with radially inwardly projecting shoulders 6 is inserted into the wheel rim 3, which shoulders determine certain angles of rotation with their radial delimitations and certain ranges of angles of rotation with the help of their circumferential extensions which can be detected by an associated sensor which is stationary with respect to the rotating wheel body 1. The transmitter ring 5 rests axially with its one face side on supports 7, e.g. welding projections, to which the transmitter ring 5 can be welded by spot welding. It is also possible to provide any other suitable fastening method to connect the transmitter ring 5 with the supports 7. The supports 7 are disposed in the neck range of the spokes 4 on the wheel rim 3 and form with their machining neck an axially normal bearing surface for the transmitter ring 5. Since, as a result of the support of transmitter ring 5 on the supports 7, it is possible to substantially prevent any distortion of the transmitter ring 5 because the necks 6 project radially only to a comparably small amount over the actual ring body and expand in sectors against said ring body. This means that the transmitter ring 5, as compared to transmitter rings which are disposed on the hub 2, are provided with radially outwardly projecting necks and correspond in their position and arrangement to the necks 6 of a transmitter ring 5 in accordance with the invention, need to have a clearly reduced torsional stiffness for maintaining the required run-out tolerances, which has a direct effect on the thickness and concerning the ring weight. Moreover, the balance error which is caused by such transmitter rings is reduced in comparison with conventional transmitter rings. Since it is also possible to reduce the production efforts, particularly favorable constructional conditions are obtained without having to make any changes concerning the sensor.

What is claimed is:

1. A chain wheel with a wheel body consisting of a wheel rim and a wheel hub, which wheel body carries a separate transmitter ring with radially inwardly projecting shoulders for detecting various angles of rotation or ranges of angles of rotation, the transmitter ring being inserted into the wheel rim and attached to supports distributed over the inner circumference of the wheel rim to form an axial support for the transmitter ring.

2. A chain wheel as claimed in claim 1, characterized in that the supports are provided in the neck-zone of spokes on the wheel rim.

3. A chain wheel as claimed in claim 1, characterized in that the transmitter ring is attached to the supports by spot welding.

* * * * *